US012256268B2

(12) United States Patent
Shekhar et al.

(10) Patent No.: US 12,256,268 B2
(45) Date of Patent: *Mar. 18, 2025

(54) BINDING INDICATIONS FOR LOAD BALANCING AND REDUNDANCY FOR COMMUNICATIONS BETWEEN NETWORK FUNCTION INSTANCES IN A 5G CORE NETWORK

(71) Applicant: Cisco Technology, Inc., San Jose, CA (US)

(72) Inventors: Ravi Shekhar, Maharastra (IN); Ameo Ghosh, Maharashtra (IN); Aeneas Sean Dodd-Noble, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 18/187,050

(22) Filed: Mar. 21, 2023

(65) Prior Publication Data

US 2023/0224756 A1 Jul. 13, 2023

Related U.S. Application Data

(63) Continuation of application No. 17/081,636, filed on Oct. 27, 2020, now Pat. No. 11,659,440.

(30) Foreign Application Priority Data

Aug. 12, 2020 (IN) .............................. 202021034625

(51) Int. Cl.
*H04L 41/40* (2022.01)
*H04L 67/56* (2022.01)
(Continued)

(52) U.S. Cl.
CPC ............. *H04W 28/08* (2013.01); *H04L 41/40* (2022.05); *H04L 67/56* (2022.05); *H04W 28/084* (2023.05); *H04W 84/042* (2013.01)

(58) Field of Classification Search
CPC ............... H04W 28/08; H04W 84/042; H04L 67/1001; H04L 67/563
See application file for complete search history.

(56) References Cited

U.S. PATENT DOCUMENTS 5,483,652 A * 1/1996 Sudama .............. G06F 16/2246
709/201
8,054,780 B1 11/2011 Manroa et al.
(Continued)

FOREIGN PATENT DOCUMENTS

WO 2018104769 A1 6/2018
WO 2019101340 A1 5/2019
(Continued)

OTHER PUBLICATIONS

"3GPP TS 29.500 v16.4.0, Jun. 2020, 3rd Generation Partnership Project, Technical Specification Group Core Network and Terminals, 5G System, Technical Realization of Service Based Architecture, Stage 3 (Release 16)" (hereinafter as "3GPP TS 29.500") (Year: 2020).*

(Continued)

*Primary Examiner* — Walli Z Butt
*Assistant Examiner* — Thad N Defauw
(74) *Attorney, Agent, or Firm* — Edell, Shapiro & Finnan, LLC

(57) ABSTRACT

In a Fifth Generation (5G) network having an enhanced SBA (eSBA) architecture, a message with a header used to signal binding information (e.g. HTTP custom header for 3gpp-Sbi-Binding) may be received at a recipient NF (service) instance in a direct communication or via a service (Continued)

communication proxy (SCP) in an indirect communication. A binding indication comprising an address of an NF (service) instance may be obtained from the header. One or more alternative binding indications comprising one or more alternative addresses of one or more alternative NF (service) instances may also be obtained from the header. The one or more alternative NF (service) instances may be equivalent NFs (services) of the same NF (Service) Set as the NF (service) instance. The address may be used for communication of messages to the NF (service) instance, and the one or more alternative addresses may be used for load balancing or backup failure.

20 Claims, 11 Drawing Sheets

(51) Int. Cl.
*H04W 28/08* (2023.01)
*H04W 28/084* (2023.01)
*H04W 84/04* (2009.01)

(56) References Cited

U.S. PATENT DOCUMENTS

| | | | |
|---|---|---|---|
| 2019/0116486 A1 | 4/2019 | Kim et al. | |
| 2019/0215724 A1 | 7/2019 | Talebi Fard et al. | |
| 2019/0230556 A1 | 7/2019 | Lee | |
| 2020/0008184 A1 | 1/2020 | Lee et al. | |
| 2020/0028920 A1 | 1/2020 | Livanos et al. | |
| 2020/0099703 A1 | 3/2020 | Singh | |
| 2020/0127916 A1 | 4/2020 | Krishan | |
| 2020/0128503 A1 | 4/2020 | Li et al. | |
| 2020/0133737 A1* | 4/2020 | Gunaratne | G06F 9/5077 |

FOREIGN PATENT DOCUMENTS

| | | |
|---|---|---|
| WO | 2019221646 A1 | 11/2019 |
| WO | 2020027713 A1 | 2/2020 |
| WO | 2020039348 A2 | 2/2020 |

OTHER PUBLICATIONS

"5G; 5G System; Network function repository services; Stage 3 (3GPP TS 29.510 version 15.1.0 Release 15)," 3GPP 5G, ETSI TS 129 510 V15.1.0, Oct. 2018, 87 pages.
3GPP, "3rd Generation Partnership Project; Technical Specification Group Core Network and Terminals; 5G System; Network Function Repository Services; Stage 3 (Release 16)", 3GPP TS 29.510 V16.2.0, Dec. 2019, 167 pages.
3GPP, "3rd Generation Partnership Project; Technical Specification Group Core Network and Terminals; 5G System; Access and Mobility Management Services; Stage 3 (Release 16)", 3GPP TS 29.518 V16.2.0, Dec. 2019, 226 pages.
E. Voit et al., "Custom Subscription to Event Notifications draft-eitf-netconf-subscribed-notifications-05", NETCONF, Oct. 2, 2017, 33 pages.
3GPP, "3rd Generation Partnership Project; Technical Specification Group Services and System Aspects; Telecommunication management; Charging management; 5G system; Services, operations and procedures of charging using Service Based Interface (SBI) (Release 16)", 3GPP TS 32.290 V16.3.0, Dec. 2019, 34 pages.
3GPP, "3rd Generation Partnership Project; Technical Specification Group Core Network and Terminals; 5G System; Session Management Policy Control Service; Stage 3 (Release 16)", 3GPP TS 29.512 V16.3.0, Dec. 2019, 178 pages.
3GPP, "3rd Generation Partnership Project; Technical Specification Group Core Network and Terminals; 5G System; Session Management Event Exposure Service; Stage 3 (Release 16)", 3GPP TS 29.508 V16.2.0, Dec. 2019, 41 pages.
3GPP, "3rd Generation Partnership Project; Technical Specification Group Core Network and Terminals; 5G System; Session Management Services; Stage 3 (Release 16)", 3GPP TS 29.502 V16.2.0, Dec. 2019, 211 pages.
3GPP, "3rd Generation Partnership Project; Technical Specification Group Core Network and Terminals; 5G System; Technical Realization of Service Based Architecture; Stage 3 (Release 16)", 3GPP TS 29.500 V16.3.0, Mar. 2020, 65 pages.
3GPP, "3rd Generation Partnership Project; Technical Specification Group Services and System Aspects; System Architecture for the 5G System; Stage 2 (Release 15)", 3GPP TS 23.501 V15.3.0, Sep. 2018, 226 pages.
Oracle, "Oracle Communications Cloud Native Core Solution", Version 2.0, retrieved from Internet Aug. 2020, 7 pages.
3GPP, "3rd Generation Partnership Project; Technical Specification Group Core Network and Terminals; 5G System; Technical Realization of Service Based Architecture; Stage 3 (Release 16)", 3GPP TS 29.500 V16.4.0, Jun. 2020, 79 pages.
R. Fielding, Ed et al., "Hypertext Transfer Protocol (HTTP/1.1): Message Syntax and Routing", Internet Engineering Task Force (IETF), ISSN: 2070-1721, Jun. 2014, 89 pages.
Oracle, "Service Communication Proxy (SCP) Cloud Native User's Guide", Release 1.1, Jul. 2019, 82 pages.
3GPP, "3rd Generation Partnership Project; Technical Specification Group Services and System Aspects; System architecture for the 5G System (5GS); Stage 2 (Release 16)", 3GPP TS 23.501 V16.5.1, Aug. 2020, 440 pages.
International Search Report and Written Opinion in International Application No. PCT/US2021/044948, mailed Nov. 4, 2021, 18 pages.

* cited by examiner

BINDING INDICATIONS FOR LOAD BALANCING AND REDUNDANCY FOR COMMUNICATIONS BETWEEN NETWORK FUNCTION INSTANCES IN A 5G CORE NETWORK

CROSS REFERENCE TO RELATED APPLICATIONS

This application is a continuation of U.S. application Ser. No. 17/081,636, filed Oct. 27, 2020, which claims priority to Indian Provisional Patent Application No. 202021034625 filed Aug. 12, 2020. The entirety of each of these applications is incorporated herein by reference.

TECHNICAL FIELD

The present disclosure relates to telecommunication systems, and in particular, to the communication of binding indications for load balancing and redundancy processing for communications amongst network function (NF) instances in an enhanced Service-Based Architecture (eSBA) of a Fifth Generation (5G) core network.

BACKGROUND

An enhanced SBA (eSBA) architecture for a Fifth Generation (5G) network is defined in Third Generation Partnership Project (3GPP) Technical Specification (TS) 23.501 for Release 16, introducing the concepts of a Network Function (NF) Set and an NF Service Set. In the eSBA architecture, NF (service) instances from two different NF (Service) Sets may communicate directly with each other or indirectly via a Service Communication Proxy (SCP).

Use of the SCP may provide many benefits, including load balancing, routing control, message priority assignments or override, circuit breaking and outlier detection, overload control, and observability. Current approaches to load balancing using the SCP are quite limited in scope, however, and may be difficult to achieve or challenging to implement in actual practice without additional enhancements.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

DESCRIPTION OF EXAMPLE EMBODIMENTS

Figure 1A:
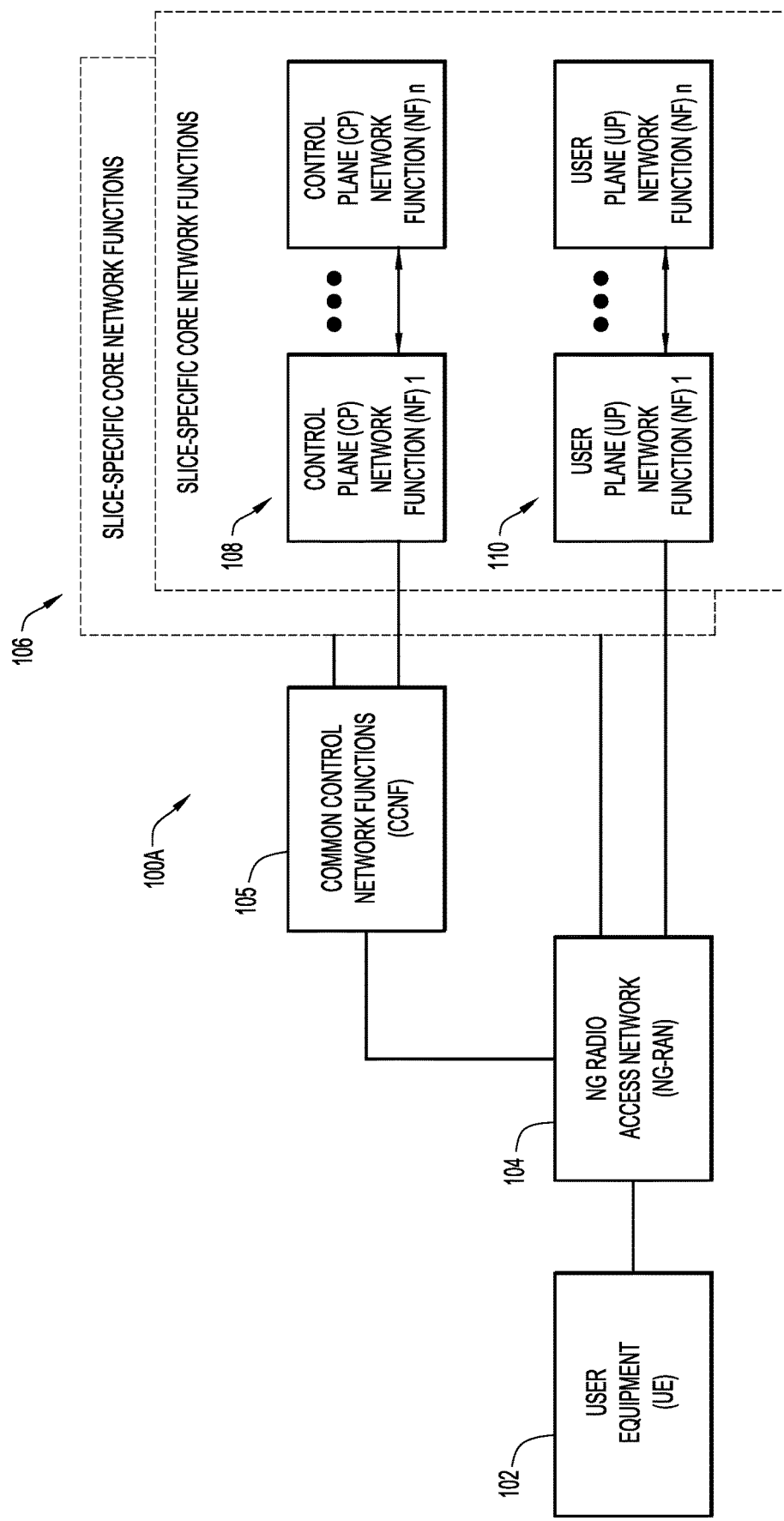
FIG. 1A is an illustrative representation of a basic network architecture of a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for communicating binding indications for load balancing and redundancy processing for communications amongst network function (NF) instances in a network are described herein. The techniques and mechanisms of the present disclosure may be suitable for use in relation to a Third Generation Partnership Project (3GPP) Fifth Generation (5G) network having an enhanced Service-Based Architecture (eSBA). The techniques and mechanisms of the present disclosure may be used for the communication of messages directly between NF (service) instances or indirectly via a proxy such as an Service Communication Proxy (SCP).

In one illustrative example, an NF (service) instance may obtain one or more alternative addresses of one or more alternative NF (service) instances, where the one or more alternative NF (service) instances may be equivalent NFs (services) of the same NF (Service) Set as the NF (service) instance. The one or more alternative NF (service) instances may be configured to have access to the same context data for processing as the NF (service) instance. The NF (service) instance may construct a message with a header used to signal binding information. The message may indicate either a (e.g. service) request or a (e.g. service) response. In some implementations, the header used to signal binding information may be a Hypertext Transfer Protocol (HTTP) custom header for 3gpp-Sbi-Binding according to 3GPP specifications. In constructing the message, the header may be populated with a binding indication comprising an address of the NF (service) instance. In addition, the header may be populated with one or more alternative binding indications comprising the one or more alternative addresses of one or more alternative NF (service) instances.

The message may be sent for communication to a recipient NF (service) instance. The message may be sent directly to the recipient NF (service) instance in a direct communication, or indirectly to the recipient NF (service) instance in an indirect communication via a proxy, such as an SCP. At the recipient NF (service) instance and/or at the SCP, the address of the NF (service) instance and the one or more alternative addresses of the one or more alternative NF (service) instances may be cached. The address may be used for communication of messages to the NF (service) instance, and the one or more alternative addresses of the one or more alternative NF (service) instances may be used for load balancing or backup failure in relation the communication of the messages.

In some implementations, each of the one or more alternative binding indications may indicated in the header with use of a scope parameter having a predetermined value or designation indicating it as an equivalent NF or equivalent NF service. As examples, the predetermined value or designation may be "peer," "peer service," "member," or "member service" or the like. In some implementations, each of the one or more binding indications may be associated with an additional parameter or value indicating a priority or a weight value for the load balancing or the backup failure.

Again, the message may indicate either a (e.g. service) request or a (e.g. service) response. Where the NF (service) instance is an NF Consumer instance, the one or more alternative NF (service) instances may be one or more alternative NF Consumer instances, and the recipient NF (service) instance may be an NF Producer instance. Where the NF (service) instance is an NF Producer instance, the one or more alternative NF (service) instances may be one or more alternative NF Producer instances, and the recipient NF (service) instance may be an NF Consumer instance. In some implementations, the NF (service) instance may include the multiple binding indications in the initial request or response for use as described, and refrain from including any binding indications in subsequent requests or responses.

In another illustrative example, a recipient NF (service) instance or an SCP thereof may receive a message with a header used to signal binding information. The message may indicate either a (e.g. service) request or a (e.g. service) response. In some implementations, the header used to signal binding information may be an HTTP custom header for 3gpp-Sbi-Binding according to 3GPP specifications. A binding indication comprising an address of an NF (service) instance may be obtained from the header. In addition, one or more alternative binding indications comprising one or more alternative addresses of one or more alternative NF (service) instances may also be obtained from the header. The one or more alternative NF (service) instances may be equivalent NFs (services) of the same NF (Service) Set as the NF (service) instance. The NF (service) instance may be configured to have access to context data for processing, and the one or more alternative NF (service) instances may be configured to have access to the same context data for processing as the NF (service) instance. The address of the NF (service) instance and the one or more alternative addresses of the one or more alternative NF (service) instances may be cached (step 708 of FIG. 7). The address may be used for communication of messages to the NF (service) instance, and the one or more alternative addresses of the one or more alternative NF (service) instances may be used for load balancing or backup failure in relation the communication of the messages.

In some implementations, each of the one or more alternative binding indications may indicated in the header with use of a scope parameter having a predetermined value or designation indicating it as an equivalent NF or equivalent NF service. In some implementations, the predetermined value or designation may be "peer," "peer service," "member," or "member service" or the like. In some further implementations, each of the one or more binding indications may be associated with an additional parameter or value indicating a priority or a weight value for the load balancing and/or backup failure.

Again, the message may indicate either a (e.g. service) request or a (e.g. service) response. Where the NF (service) instance is an NF Consumer instance, the one or more alternative NF (service) instances may be one or more alternative NF Consumer instances, and the recipient NF (service) instance may be an NF Producer instance. Where the NF (service) instance is an NF Producer instance, the one or more alternative NF (service) instances may be one or more alternative NF Producer instances, and the recipient NF (service) instance may be an NF Consumer instance. In some implementations, the NF (service) instance may include the multiple binding indications in the initial request or response for use as described, and refrain from including any binding indications in subsequent requests or responses.

More detailed and alternative techniques and implementations are provided herein as described below.

EXAMPLE EMBODIMENTS

Techniques and mechanisms for communicating binding indications for load balancing and redundancy processing for communications amongst network function (NF) (service) instances in a network are described herein. The techniques and mechanisms of the present disclosure may be suitable for use in relation to a Third Generation Partnership Project (3GPP) Fifth Generation (5G) network having an enhanced Service-Based Architecture (eSBA). In at least some implementations, the techniques and mechanisms may offer a simple, efficient processing to achieve reliable load balancing and/or redundancy processing (e.g. for backup recovery) in the communications amongst NF (service) instances.

In the present disclosure, NF terminology which involves a parenthetical for "service," such as "an NF (service)

instance of an NF (Service) Set," is provided as shorthand to refer to or include either one or both of the two distinct possibilities: "an NF instance of an NF Set" and/or "an NF service or NF service instance of an NF Service Set." It is further noted that either one or both of the two distinct possibilities may be intended in the description even without use of the above-mentioned NF terminology (e.g. where only one of the two possibilities is indicated).

In an eSBA architecture, NF (service) instances from two different NF (Service) Sets may communicate directly with each other or indirectly via a Service Communication Proxy (SCP). In an illustrative example, an NF "consumer" instance may identify one or more other NF (service) instances that it belongs to, that is, of the same NF (Service) Set. The other NF (service) instances in the same NF (Service) Set are considered equivalent NFs (services) and have access to the same context data for processing as the NF (service) instance. When sending a service request to a NF "producer" instance via the SCP, the NF consumer instance may utilize this information to populate multiple binding indications in a header of the message. The multiple binding indications in the header may indicate the NF consumer instance as well as one or more of its peers or peer services.

In some preferred implementations, the header may be a Hypertext Transfer Protocol (HTTP) custom header for 3gpp-Sbi-Binding as provided for in current 3GPP specifications. Here, an additional value or designation for a parameter (e.g. a "scope" parameter) may be defined for the header for 3gpp-Sbi-Binding to indicate that the binding is associated with one of the NF (service) instance's peers or peer services (or, e.g., member or member services, etc.).

In some implementations, the SCP may use this binding information to evenly distribute traffic amongst all the peers indicated in the header (or, for example, use it for redundancy or fallback processing). Since all the NF (service) instances belong to the same NF (Service) Set, they all have access to the same appropriate session context data and can easily process the traffic. In other implementations, the NF producer instance may use this binding information to evenly distribute the traffic among all the peers indicated in the header (or, for example, use it for redundancy or fallback processing).

To better illustrate, FIG. 1A is an illustrative representation of a general network architecture 100A of a 5G network. Network architecture 100A includes common control network functions (CCNF) 105 and a plurality of slice-specific core network functions 106. With network architecture 100A, the 5G network may be configured to facilitate communications for a UE 102. UE 102 may obtain access to the 5G network via a radio access network (RAN) or a Next Generation (NG) RAN (NG-RAN) 104. NG-RAN 104 may include one or more base stations or gNodeBs (gNBs), such as a gNB 107. UE 102 may be any suitable type of device, such as a cellular telephone, a smart phone, a tablet device, an Internet of Things (IoT) device, a Machine-to-Machine (M2M) device, and a sensor, to name but a few.

Network architecture 100A of the 5G network includes an SBA which may provide a modular framework from which common applications can be deployed using components of varying sources and suppliers. The SBA of the 5G network may be configured such that control plane functionality and common data repositories are provided by way of a set of interconnected NFs, each with authorization to access each other's services.

Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an Access and Mobility Management Function (AMF) and a Network Slice Selection Function (NSSF). UE-level mobility management, authentication, and network slice instance selection are examples of functionalities provided by CCNF 105. On the other hand, slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a Session Management Function (SMF), whereas UP NFs 110 may include, for example, a User Plane Function (UPF).

Figure 1B:
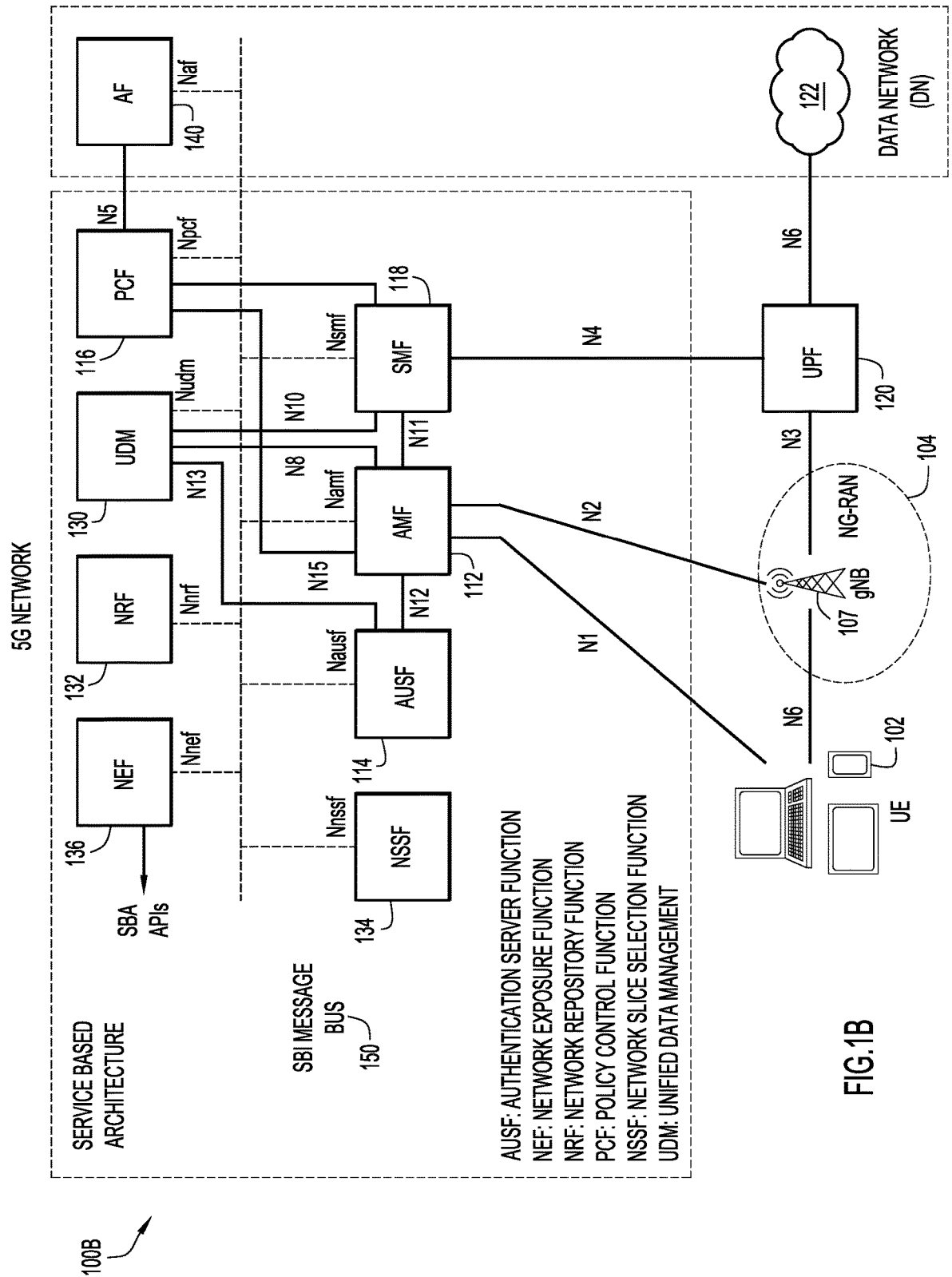
FIG. 1B is an illustrative representation of a more detailed network architecture of the 5G network of FIG. 1A, showing a Service-Based Architecture (SBA) or an enhanced SBA (eSBA) of the 5G network.

FIG. 1B is an illustrative representation of a more detailed network architecture 100B of the 5G network of FIG. 1A. As provided in 3GPP standards for 5G (e.g. 3GPP Technical Specifications or "TS" 23.501 and 23.502), network architecture 100B for the 5G network may include an AMF 112, an Authentication Server Function (AUSF) 114, a Policy Control Function (PCF) 116, an SMF 118, and a UPF 120 which may connect to a Data Network (DN) 122. Other NFs in the 5G network include an NSSF 134, a network exposure function (NEF) 136, an NF repository function (NRF) 132, and a Unified Data Management (UDM) function 130. A plurality of interfaces and/or reference points N1-N8, N10-N13, and N15 shown in FIG. 1B (as well as others) may define the communications and/or protocols between each of the entities, as described in the relevant (evolving) standards documents.

In FIG. 1B, UPF 120 is part of the user plane and all other NFs (i.e. AMF 112, AUSF 114, PCF 116, SMF 118, and UDM 130) are part of the control plane. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling.

The SBA of the 5G network is better illustrated in FIG. 1B, again whereby the control plane functionality and common data repositories are provided by way of the set of interconnected NFs. Assuming the role of either service consumer or service producer, NFs may be self-contained, independent and reusable. With the SBA, each NF service may expose its functionality through a Service Based Interface (SBI) message bus 150. SBI message bus 150 may employ a Representational State Transfer (REST) interface (e.g. using HTTP/2). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for AF 140.

Network slicing brings a high degree of deployment flexibility and efficient resource utilization when deploying diverse network services and applications. NSSF 134 may facilitate network slicing in the 5G network, as it operates to select network slice instances (NSIs) for UEs. A logical, end-to-end network slice may have predetermined capabilities, traffic characteristics, and service level agreements (SLAs), and may include the virtualized resources required to service the needs of a Mobile Virtual Network Operator (MVNO) or group of subscribers, including a dedicated UPF 120, SMF 118, and PCF 116.

UDM 130 may provide services to SBA functions, such as AMF 112, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context.

One or more application functions, such as an Application Function (AF) 140 may connect to the 5G network. AF 140 may interact with the network via NEF 136 in order to access network capabilities. NEF 136 may securely expose network capabilities and events provided by NFs to AF 140, and may provide a means for AF 140 to securely provide information to the 5G network.

An NF instance is an identifiable instance of an NF. In general, NRF 132 may maintain NF profiles of available NF instances and their associated services, and support a service discovery function for service discovery associated with the NF profiles. NF profiles of NF instances maintained in NRF 132 may include NF instance ID, NF type (e.g. AMF, SMF, PCR, UPF, etc.), network slice identifiers such as NSI ID, NF capacity information, names of supported services, etc. For service discovery, NRF 132 may receive a discovery request from an NF instance and provide information associated with the discovered NF instance to the NF instance in response.

An eSBA architecture is defined in 3GPP TS 23.501 for Release 16 (see e.g. 3GPP TS 23.501, version 16.5.1 Release 16, 2020-08). The eSBA architecture introduces what are referred to as an NF Set and an NF Service Set. An NF Set is a group of interchangeable NF instances of the same type, supporting the same services and the same network slice. The NF instances of the same NF Set may be geographically distributed but have access to the same context data. On the other hand, an NF service is a functionality exposed by an NF through the SBI and consumed by other authorized NFs. An NF service instance is an identifiable instance of an NF service, and an NF service operation is an elementary unit that an NF service is composed of. An NF Service Set is a group of interchangeable NF service instances of the same service type within an NF instance. The NF service instances in the same NF Service Set have access to the same context data.

Figure 2:
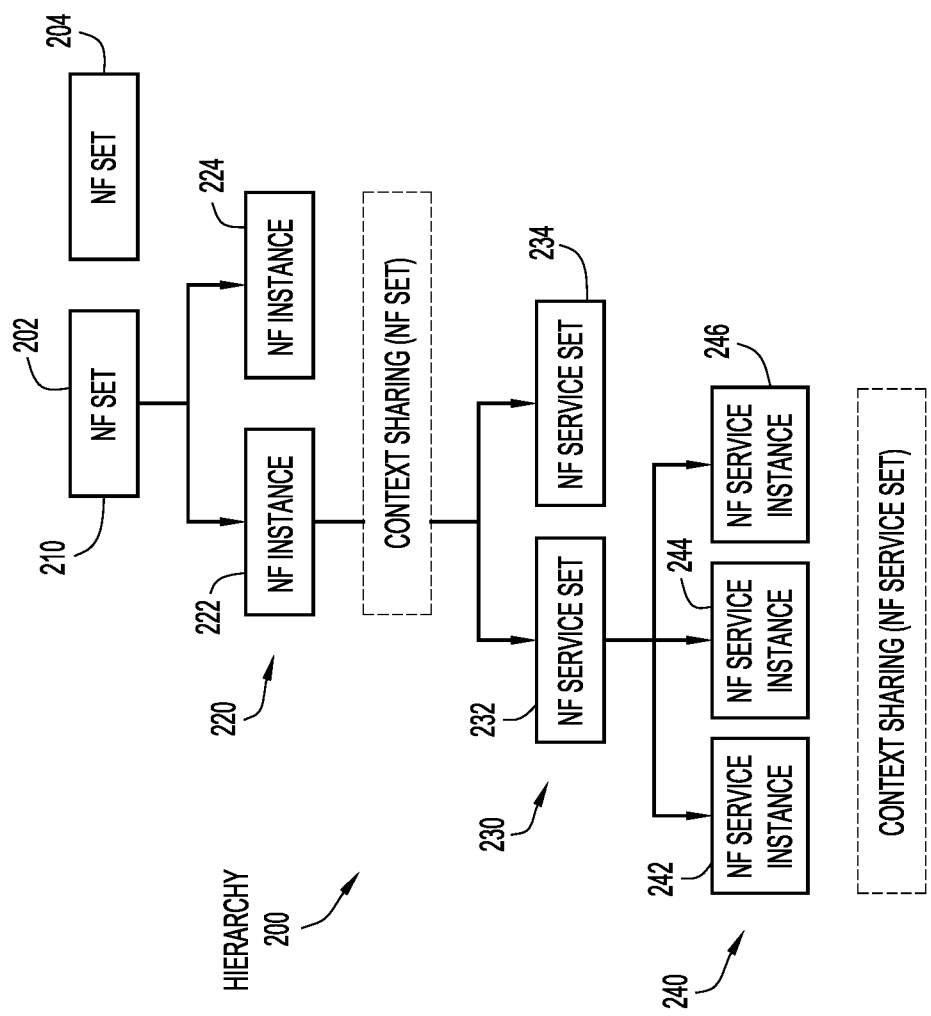
FIG. 2 is an illustration of a network function (NF) hierarchy of an NF Set, which includes NF instances, NF Service Sets and NF service instances.

FIG. 2 is an illustration of a hierarchy 200 of an NF Set 202. NF Set 202 may be associated with a plurality of NF instances 220 (e.g. an NF instance 222 and an NF instance 224). As illustrated, NF instance 222 of NF Set 202 is configured to have access to context data for processing, and NF instance 224 of the same NF Set 202 is configured to have access to the same context data for processing as the NF instance 222 (e.g. whether such access involves the same or different physical memory or location). The plurality of NF instances 220 of NF Set 202 are distinguishable from NF instances of an NF Set 204. For example, the plurality of NF instances 220 of NF Set 202 do not have access to the same context data as NF instances of NF Set 204.

An NF instance may be associated with a plurality of different NF Service Sets. For example, NF instance 222 may be associated with a plurality of NF Service Sets 230 (e.g. an NF Service Set 232 and an NF Service Set 234). An NF Service Set may be associated with a plurality of different NF service instances. In the example of FIG. 2, NF Service Set 232 may be associated with a plurality of NF service instances 240 (e.g. an NF service instance 242, an NF service instance 244, and an NF service instance 246). As illustrated, NF service instance 242 of NF Service Set 232 is configured to have access to context data for processing, and NF service instances 244 and 246 of the same NF Service Set 232 are configured to have access to the same context data for processing as the NF service instance 242 (e.g. whether such access involves the same or different physical memory or location). The plurality of NF service instances 240 of NF Service Set 232 are distinguishable from NF service instances of NF Service Set 234. For example, the plurality of NF service instances 240 of NF Service Set 232 do not have access to the same context data as NF service instances of NF Service Set 234.

An NF service is one type of capability exposed by an NF (e.g. an NF service "producer") to other authorized NFs (e.g. one or more NF service "consumers") through the SBI. 3GPP TS 23.501 defines the roles of consumer and producer NFs. A consumer is the NF which requests a related service, while the NF which exposes the requested service is the producer. A target Uniform Resource Indicator (URI) may be used to access an NF service of an NF service producer (e.g. to invoke service operations). An endpoint address may be used to determine a host/authority part of a target URI. The endpoint address may be an address in the format of an IP address or Fully-Qualified Doman Name (FQDN). Each NF (service) instance in an NF (Service) Set may expose a different resource URI, provided to the NRF in NF profile information that is received during registration.

NF (service) instances may communicate "directly" with each other or "indirectly" via an SCP. In "Direct Communication," an NF Service consumer may perform discovery of a target NF Service producer by local configuration or via the NRF, and then communicate with the target NF Service producer directly. In "Indirect Communication," the NF Service consumer may communicate with the target NF Service producer via an SCP. Here, the NF Service consumer may be configured to perform discovery of the target NF Service producer directly, or delegate the discovery of the target NF Service producer to the SCP.

Figure 3:
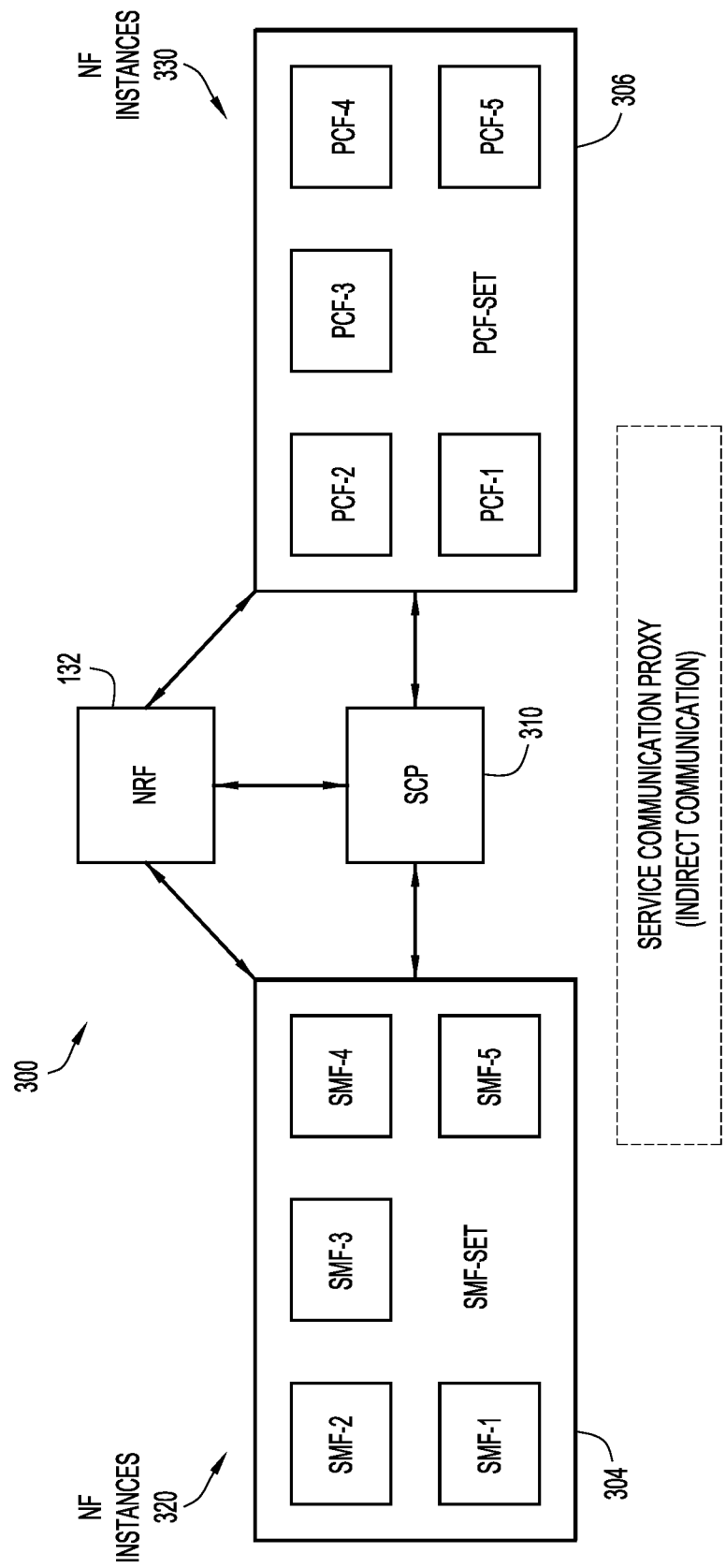
FIG. 3 is an illustrative example of an eSBA architecture of a 5G network, showing NF instances of two different NF Sets in indirect communication with each other via a Service Communication Proxy (SCP)

FIG. 3 is an illustrative example of an eSBA architecture 300 of a 5G network, showing NF instances of two different NF sets 304 and 306 in indirect communication with each other via an SCP 310. In FIG. 3, NF Set 304 is an SMF Set (i.e. an NF Set of SMF instances, SMF-1 through SMF-5) and an NF Set 306 is a PCF Set (i.e. an NF Set of PCF instances, PCF-1 through PCF-5). NF instances of the NF Sets 304 and 306, as well as SCP 310, may interface with NRF 132.

Figure 4:
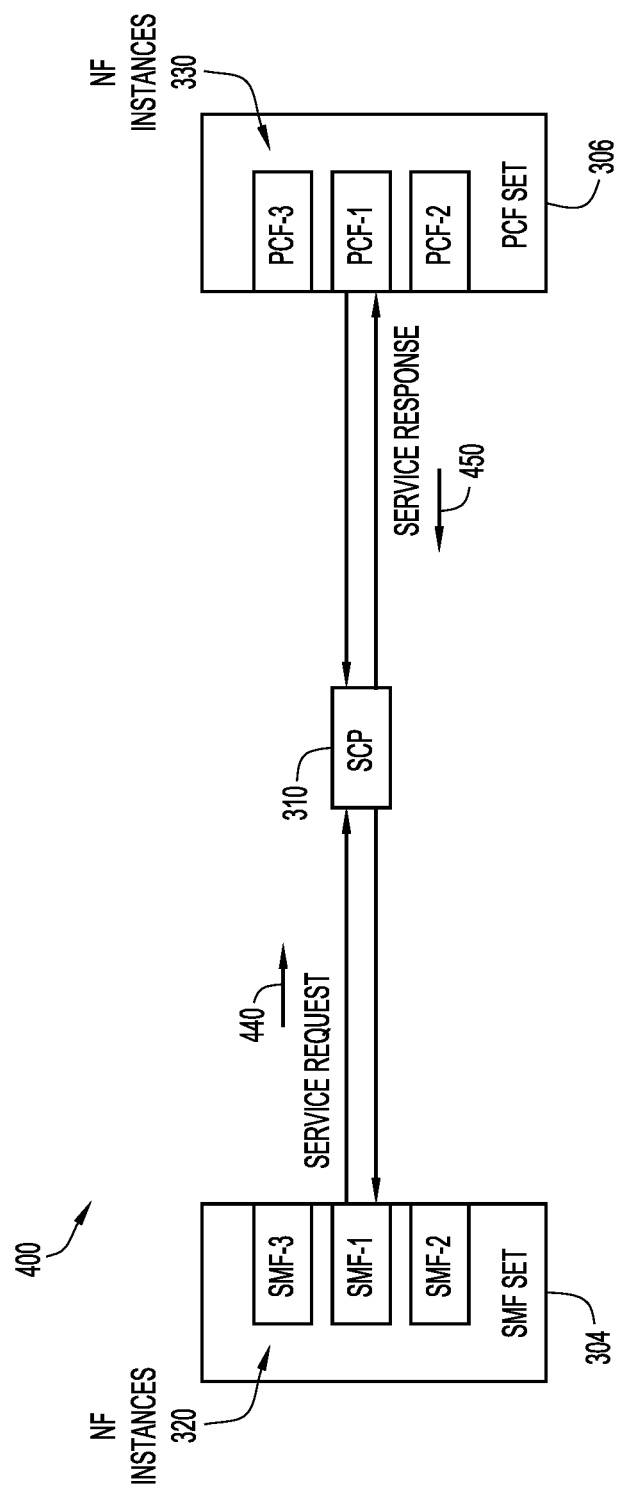
FIG. 4 is a similar illustrative example of the eSBA architecture of the 5G network, showing NF instances of two different NF Sets in indirect communication with each other via the SCP, and communicating messages indicating a service request and a service response.

FIG. 4 is a more simplified, similar illustrative example of an eSBA architecture 400 of the 5G network as shown in FIG. 3, again with the NF instances of two different NF Sets 304 and 306 in indirect communication with each other via SCP 310. In FIG. 4, it is shown that an NF instance (i.e. SMF-1) of NF Set 304 (i.e. the SMF Set) may send a message indicating a service request 440 to another NF instance (i.e. PCF-1) of NF Set 306 (i.e. the PCF Set). Further, it is shown that the NF instance (i.e. PCF-1) of NF Set 306 (i.e. the PCF Set) may respond to send a message indicating a service response 450 back to the NF instance (i.e. SMF-1) of NF Set 304 (i.e. the SMF Set).

In general, SCP 310 of FIGS. 3 and 4 may serve as a router between producer and consumer sets; every message between the producer and consumer may pass through it. A message indicating a service request or a service response may include an address which may be set to the NF instance or NF Set, although the message is routed via SCP 310 using the address of SCP 310. In some implementations (e.g. in relatively large deployments), the address of SCP 310 may be discovered via NRF 132; in alternative implementations (e.g. in relatively smaller deployments), the address of SCP 310 may be hardcoded in the NF Sets. In some implementations, SCP 310 may be deployed as a default outbound proxy to NF instances; in alternative implementations (e.g. in cloud native environments), a router model may be utilized where SCP 310 may be configured as an http2 outbound proxy at each NF.

Without SCP 310, the SBA of the 5G network does not naturally lend itself to an efficient load balancing of NFs. With SCP 310, load balancing across available NFs may be improved. SCP 310 has a complete view of all messages arriving for a given NF type, and may support techniques such as round-robin, weighted round-robin, transaction latency, etc., even factoring in current loading and NF availability. By leveraging its position in the network, SCP 310 may provide for routing control, resiliency, message priority assignments or override, circuit breaking and outlier detection, overload control, and/or observability. SCP 310 may also relieve NFs from retaining and interpreting complex routing rules associated with next hop selection and, at the same time, make re-routing decisions based on load conditions and status of NF providers. In the absence of an alternate route, SCP 310 may reject requests destined to a failed or degraded NF, thereby further serving as a circuit breaker. This may prevent valuable resources from being tied up waiting for responses. SCP 310 may also perform retries on behalf of a service user, which relieves the service user from such a burden.

Again, using SCP 310, load balancing across NFs may be improved. Typically, each NF (service) instance registers with NRF 132 directly using its own endpoint address for the various services that it supports. SCP 310 may consult NRF 132 and use the information to apply a load balancing function to ensure that traffic is distributed amongst all the NF (service) instances in an NF (Service) Set.

However, current approaches to provide load balancing using SCP 310 are quite limited in scope. Further, load balancing decisions are split into the consumer NF, SCP 310 and NRF 132. Given many different factors, load balancing with use of SCP 310 may be difficult to achieve or challenging to implement in actual practice without additional enhancements.

Figure 5:
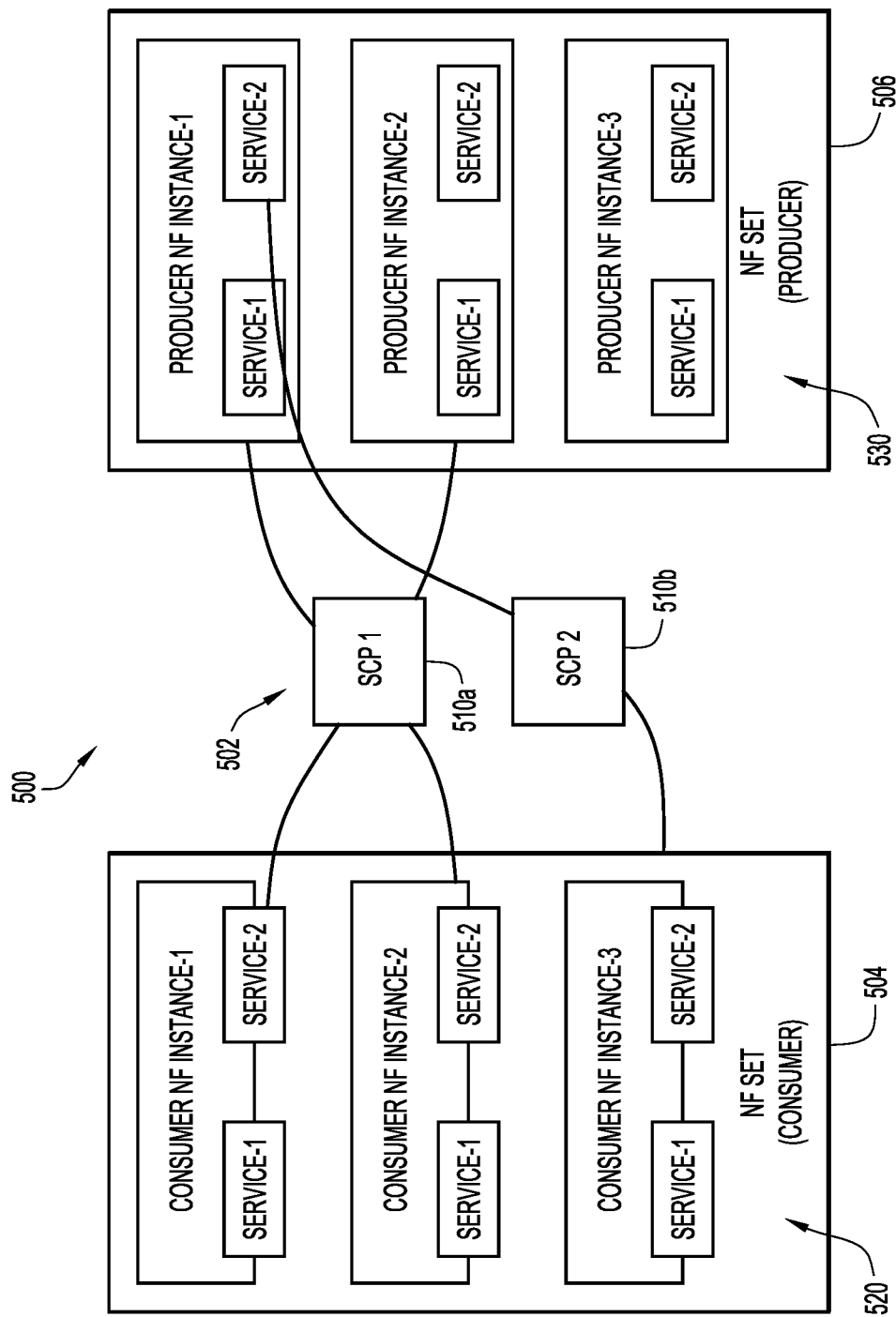
FIG. 5 is an illustrative example of an eSBA architecture of the 5G network, showing NF instances of two different NF Sets in indirect communication via multiple SCPs.

To provide redundancy, SCP 310/NRF 132 typically operate to switch traffic to an alternate NF (service) instance after detecting a failure. This is a complicated process, especially given the multiple nodes involved in the decision-making, and may lead to a very high switchover time. This problem is even more complicated in larger deployments where multiple SCPs are deployed. To better illustrate in FIG. 5, what is shown is an example eSBA architecture 500 of a 5G network, where NF instances 520 and 530 of two different NF sets (a consumer NF Set 504 and a producer NF Set 506) are in indirect communication via multiple SCPs 510a and 510b. Note that other configurations utilizing a hierarchical NRF (i.e. where multiple NRF layers are deployed) would complicate this processing even further.

What are provided herein are techniques and mechanisms for communicating binding indications for load balancing and redundancy processing for communications amongst NF (service) instances in a network (e.g. a 3GPP-based or 5G network having an eSBA). In at least some implementations, the techniques and mechanisms may offer a simple, efficient way to achieve reliable load balancing and/or redundancy processing (e.g. for backup recovery) for communications amongst NF (service) instances.

One aspect of the techniques and mechanisms of the present disclosure leverages an HTTP custom header, 3gpp-Sbi-Binding, defined in 3GPP TS 29.500. See e.g. 3GPP TS 29.500 V16.4.0 (2020-06). In this version of the specification, the concepts/definitions of "3gpp-sbi-client-binding" and "3gpp-sbi-server binding" have been merged into the concept/definition of the 3gpp-Sbi-Binding. The 3gpp-Sbi-Binding is defined for creating a binding between consumer and producer NF instances for callback, notification and subscription function. For the binding indication, a URI or address may be utilized.

Thus, a message communicated between NF (service) instances may include an HTTP custom header for 3gpp-Sbi-Binding. With reference back to FIG. 4, again, the NF instance (i.e. SMF-1) of NF Set 304 (i.e. the SMF Set) may send the message indicating the service request 440 to another NF instance (i.e. PCF-1) of NF Set 306 (i.e. the PCF Set), and the NF instance (i.e. PCF-1) of NF Set 306 (i.e. the PCF Set) may respond to send the message indicating the service response 450 back to the NF instance (i.e. SMF-1) of NF Set 304 (i.e. the SMF Set). The service request 440 and/or the service response 450 may include the HTTP custom header for 3gpp-Sbi-Binding. Per 3GPP specifications, the format of an HTTP custom header for 3gpp-Sbi-Binding (or "binding header") for the messages indicating the service request 440 and the service response 450 is provided below. In general, the encoding may follow the Augmented Backus-Naur Form (ABNF) as defined in Internet Engineering Task Force "IETF" Request for Comments (RFC) 7230.

3gpp-Sbi-Binding="3gpp-Sbi-Binding" ":" #(OWS "bl=" blvalue 1*(OWS ";" parameter) OWS ";" recoverytime)

blvalue="nf-instance" / "nf-set" / "nfservice-instance" / "nfservice-set"

parameter=parametername "=" token parametername="nfinst" / "nfset" / "nfservinst" / "nfserviceset" / "servname" /"scope"

scope="other-service" / "callback" / "subscription-events"

recoverytime="recoverytime=" OWS date-time

The blvalue indicates the binding level, which could be at NF instance level or NF set level or NF service instance level or NF service set level.

Scope indicates the applicability of the binding:

"other-service": the binding information applies to other service(s) that the NF Service Consumer may later on provide as an NF Service Producer;

"subscription-events": the binding information applies to subscription change event notifications; and "callback": the binding information applies to notification or callback requests.

According to some implementations of the present disclosure, an additional value or designation may be defined for the HTTP custom header for 3gpp-Sbi-Binding, for indicating that an alternative binding indication is provided for a peer or peer service (or e.g. a member or member service). The alternative binding indication may be associated with an equivalent NF (service) instance of the same NF (Service) Set as the "main" or "primary" binding indication.

In some implementations, the additional value or designation in the HTTP custom header for 3gpp-Sbi-Binding may be as follows:

scope="other-service" / "callback" / "subscription-events"/ "peer-service"

As shown above, the scope may indicate a "peer service" as an option, which is for an equivalent NF (service) instance. Note that other suitable values or designations may be utilized, such as "peer," "member," or "member service," "equivalent," or the like.

According to the present disclosure, multiple 3gpp-Sbi-Bindings may be sent in a service request or service response between a consumer and a producer. Multiple fields or 3gpp-Sbi-Bindings in the header may be utilized to indicate not only the NF (service) instance but also one or more alternative NF (service) instances of the same NF (Service) Set (i.e. equivalent NF instances or service instances).

In some implementations, a message may be formatted with two or more distinct headers (e.g. two or more HTTP custom headers) having two or more binding indications according to the present disclosure; alternatively, the message may be formatted with a single header (e.g. a single HTTP custom header) having the two or more binding indications (e.g. each being separated by a comma) according to the present disclosure.

In an example embodiment, an SCP may use this information to evenly distribute traffic among all of the peers indicated in the multiple 3gpp-Sbi-Bindings. Since all of the NF (service) instances belong to the same NF (Service) Set, they all will have access to the same context data and therefore can easily process the traffic. In another example embodiment, a producer NF may use this binding information to evenly distribute the traffic among all the peers indicated in the multiple 3gpp-Sbi-Bindings. This type of processing may be performed as an alternative to the SCP processing described herein or as an addition to SCP processing described herein (e.g. as a fallback option).

In some implementations, the 3gpp-Sbi-Binding may be bidirectional. That is, both the consumer NF and the producer NF may send a message having such binding information. For example, an SCP may cache and utilize this information, and the receiving NF instance may cache and utilize this information in its response. In some implementations, the 3gpp-Sbi-Binding information of the present disclosure may be exchanged during an initial service request/response (e.g. but refrain in subsequent request/responses). Subsequently, if a consumer or producer needs to change or update the binding information, then the consumer or producer may update it in another 3gpp-Sbi-Binding.

Caching may be performed at the consumer NF, the producer NF, and/or the SCP. In some implementations, the 3gpp-Sbi-Binding information may be exchanged between consumer and producer NFs during (e.g. only) the initial service request/response. Then, the SCP, the producer, and/or the consumer may store this information in its local cache for (any) further transactions (e.g. message exchanges). Upon any change (e.g. a failure or overload), the binding information may be updated in the same or similar manner.

In the case of a NF service failure or NF instance failure, switchover is simple and efficient, as the SCP or NF (service) instance already knows (i.e. in its cache) the callback/notify URIs of the peer instances or services of the failed node or service. The SCP or NF (service) instance need not implement any complex "high availability" (HA) logic to decide on how and where to switch the traffic. The NRF may detect the NF instance or service failure and notify the consumer or producer so that the entities stop sending 3gpp-Sbi-Binding information for the failed instance/service in subsequent messages. Likewise, for any addition of new instance/service, the consumer and producer may add an additional 3gpp-Sbi-Binding in the HTTP custom header in a subsequent message.

In some implementations, prioritization or weighting of traffic to a certain NF instance or NF service may be achieved through use of a "priority" or a "weighting" (e.g. defined during configuration). Here, a new additional parameter and/or value (e.g. "priority"=priority value) (or e.g. "weight"=weight value) may be added to the 3gpp-Sbi-Binding for this purpose. Accordingly, priority and/or weighting may be provided and communicated.

Accordingly, the techniques and mechanisms of the present disclosure provide a simple and efficient way to communicate binding indications for load balancing and/or redundancy processing for high availability.

Figure 6:
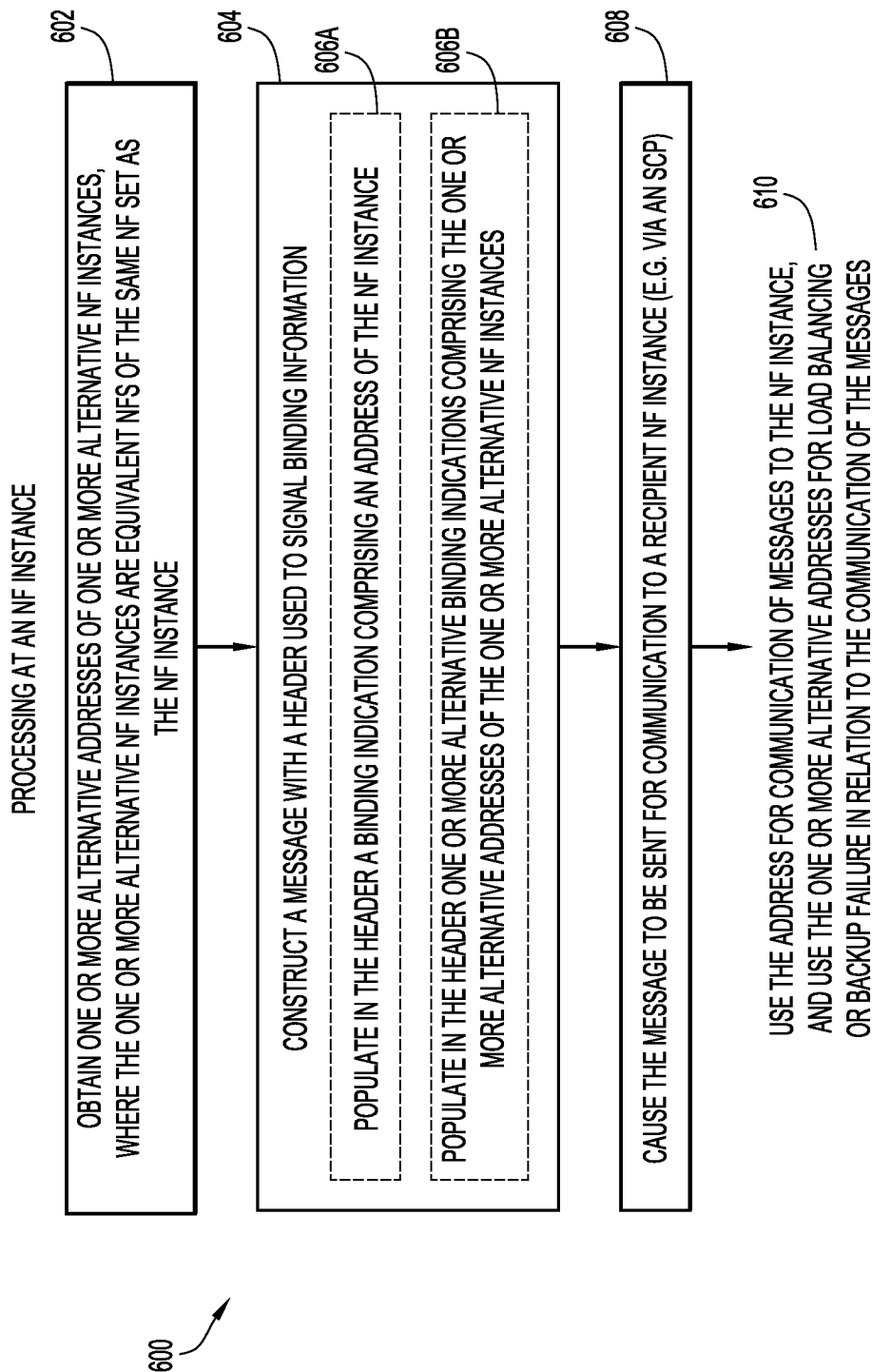
FIG. 6 is a flowchart for describing a method of communicating binding information for load balancing and/or redundancy processing for communications between NF instances or NF service instances according to some implementations of the present disclosure, which may be performed at an NF instance or NF service instance (e.g. an NF Consumer)

FIG. 6 is a flowchart 600 for describing a method of communicating binding information for load balancing and/or redundancy processing (e.g. for backup failure) for communications between NF instances or NF service instances in a network (e.g. a mobile network, such as a 5G network having an eSBA) according to some implementations of the present disclosure. The method of FIG. 6 may be performed by a computing device or a network node configured to connect in a network for communication. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as an NF instance or an NF service instance (e.g. a consumer NF instance).

An NF (service) instance is associated with its own address for communication. In the flowchart 600 of FIG. 6, the NF (service) instance may obtain one or more alternative addresses of one or more alternative NF (service) instances, where the one or more alternative NF (service) instances may be equivalent NFs (services) of the same NF (Service) Set as the NF (service) instance (step 602 of FIG. 6). The one or more alternative NF (service) instances may be configured to have access to the same context data for processing as the NF (service) instance. In one example, the NF (service) instance may obtain the one or more alternative addresses of the one or more alternative NF (service) instances of the same NF (Service) Set based on a discovery request to an NRF.

The NF (service) instance may construct a message with a header used to signal binding information (step 604 of FIG. 6). Here, the message may indicate either a (e.g. service) request or a (e.g. service) response. In some implementations, the header used to signal binding information may be an HTTP custom header for 3gpp-Sbi-Binding according to 3GPP specifications. In constructing the message, the header may be populated with a binding indication comprising the address of the NF (service) instance (step 606A of FIG. 6). The header may also be populated with one or more alternative binding indications comprising the one or more alternative addresses of one or more alternative NF (service) instances (step 606B of FIG. 6). Again, the one or more alternative NF (service) instances may be equivalent NFs (services) of the same NF (Service) Set as the NF (service) instance.

In some implementations, each of the one or more alternative binding indications may indicated in the header with use of a scope parameter having a predetermined value or designation indicating it as an equivalent NF or equivalent NF service. In some implementations, the predetermined value or designation may be "peer," "peer service," "member," or "member service" or the like.

The message may be sent for communication to a recipient NF (service) instance (step 608 of FIG. 6). The message may be sent directly to the recipient NF (service) instance in a direct communication, or indirectly to the recipient NF (service) instance in an indirect communication via an SCP. At the recipient NF (service) instance and/or at the SCP, the address of the NF (service) instance and the one or more alternative addresses of the one or more alternative NF (service) instances may be cached. At the recipient NF (service) instance and/or at the SCP, the address may be used for communication of messages to the NF (service) instance, and the one or more alternative addresses of the one or more alternative NF (service) instances may be used for load balancing or backup failure in relation the communication of the messages (step 610 of FIG. 6).

In some implementations, each of the one or more binding indications may be associated with an additional parameter or value indicating a priority or a weight value (e.g. for the load balancing or the backup failure). In one illustrative example, a priority may be indicated as "priority=1," "priority=2,", "priority=3," etc., for prioritizing the use of binding indications/members of the same NF (Service) Set according to the priority values (e.g. in the event of a backup failure). In another illustrative example, each binding indication may be associated with a weight value; for example, weights of "weight=50," "weight=25," and "weight=25" (out of a total of 100) may be assigned to three (3) NF (service) instances, for weighting the use of binding indications/members of the same NF (Service) Set (e.g. for load balancing).

Again, the message constructed in step 604 may indicate either a (e.g. service) request or a (e.g. service) response. Where the NF (service) instance is an NF Consumer instance, the one or more alternative NF (service) instances may be one or more alternative NF Consumer instances, and the recipient NF (service) instance may be an NF Producer instance. Where the NF (service) instance is an NF Producer instance, the one or more alternative NF (service) instances may be one or more alternative NF Producer instances, and the recipient NF (service) instance may be an NF Consumer instance. In some implementations, the NF (service) instance may include the multiple binding indications in the initial request or response for use as described, and refrain from including any binding indications in subsequent requests or responses.

Figure 7:
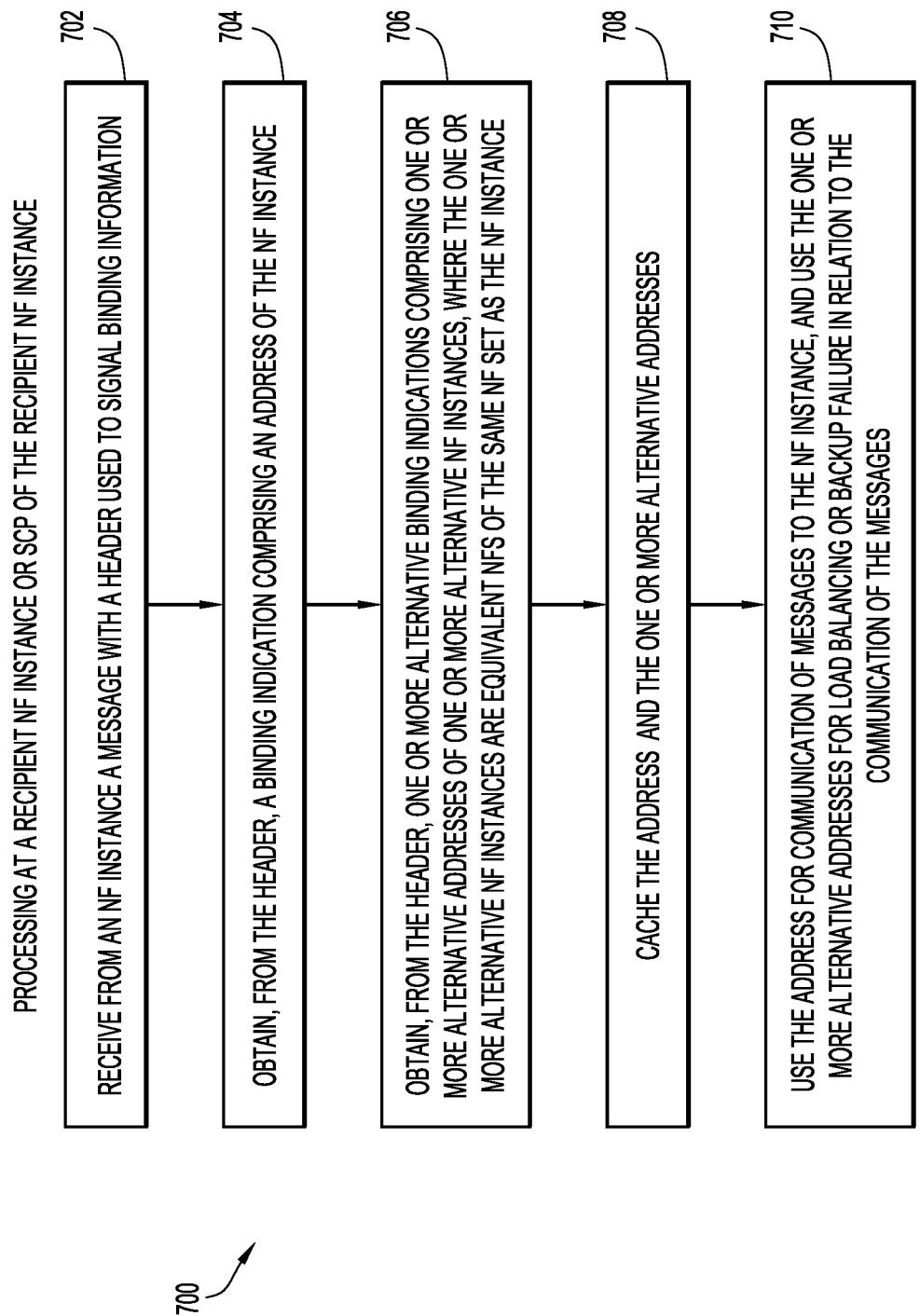
FIG. 7 is a flowchart for describing a method of communicating binding information for load balancing and/or redundancy processing for communications between NF instances or NF service instances according to some implementations of the present disclosure, which may be performed at a recipient NF instance (e.g. an NF Producer) and/or an SCP of the recipient NF instance.

FIG. 7 is a flowchart 700 for describing a method of communicating binding information for load balancing and/or redundancy processing (e.g. for backup failure) for communications between NF instances or NF service instances in a network (e.g. a mobile network, such as a 5G network having an eSBA) according to some implementations of the present disclosure. The method of FIG. 7 may be performed by a computing device or a network node configured to connect in a network for communication. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as a (recipient) NF instance or a (recipient) NF service instance (e.g. a producer NF instance). In other implementations, the instructions stored in the one or more memory elements may be executable on the one or more processors for operation as a proxy (e.g. an SCP) for communication between NF instances or NF service instances.

In the flowchart 700 of FIG. 7, a message with a header used to signal binding information may be received (step 702 of FIG. 7). Here, the message may indicate either a (e.g. service) request or a (e.g. service) response. In some implementations, the header used to signal binding information may be an HTTP custom header for 3gpp-Sbi-Binding according to 3GPP specifications. A binding indication comprising an address of an NF (service) instance may be obtained from the header (step 704 of FIG. 7). One or more alternative binding indications comprising one or more alternative addresses of one or more alternative NF (service) instances may also be obtained from the header (step 706 of FIG. 7). The one or more alternative NF (service) instances may be equivalent NFs (services) of the same NF (Service) Set as the NF (service) instance. Here, the NF (service) instance may be configured to have access to context data for processing, and the one or more alternative NF (service) instances may be configured to have access to the same context data for processing as the NF (service) instance.

The address of the NF (service) instance and the one or more alternative addresses of the one or more alternative NF (service) instances may be cached (step 708 of FIG. 7). The address may be used for communication of messages to the NF (service) instance, and the one or more alternative addresses of the one or more alternative NF (service) instances may be used for load balancing or backup failure in relation the communication of the messages (step 710 of FIG. 7).

Again, the message of step 702 may indicate either a (e.g. service) request or a (e.g. service) response. Where the NF (service) instance is an NF Consumer instance, the one or more alternative NF (service) instances may be one or more alternative NF Consumer instances, and the recipient NF (service) instance may be an NF Producer instance. Where the NF (service) instance is an NF Producer instance, the one or more alternative NF (service) instances may be one or more alternative NF Producer instances, and the recipient NF (service) instance may be an NF Consumer instance. In some implementations, the NF (service) instance may include the multiple binding indications in the initial request or response for use as described, and refrain from including any binding indications in subsequent requests or responses.

In some implementations, each of the one or more alternative binding indications may indicated in the header with use of a scope parameter having a predetermined value or designation indicating it as an equivalent NF or equivalent NF service. In some implementations, the predetermined value or designation may be "peer," "peer service," "member," or "member service" or the like.

In some implementations, each of the one or more binding indications may be associated with an additional parameter or value indicating a priority or a weight value (e.g. for the load balancing and/or backup failure). In one illustrative example, a priority may be indicated as "priority=1," "priority=2,", "priority=3," etc., for prioritizing the use of binding indications/members of the same NF (Service) Set according to the priority values (e.g. for backup recovery). In another illustrative example, each binding indication may be associated with a weight value; for example, weights of "weight=50," "weight=25," and "weight=25" (out of a total of 100) may be assigned to three (3) NF (service) instances, for weighting the use of binding indications/members of the same NF (Service) Set (e.g. for load balancing).

Again, in the above-described techniques (and elsewhere herein), a URI may be utilized to access an NF (service) instance. An endpoint address which is used to determine a host or authority part of the URI may be in the form of an IP address or FQDN.

Figure 8A:
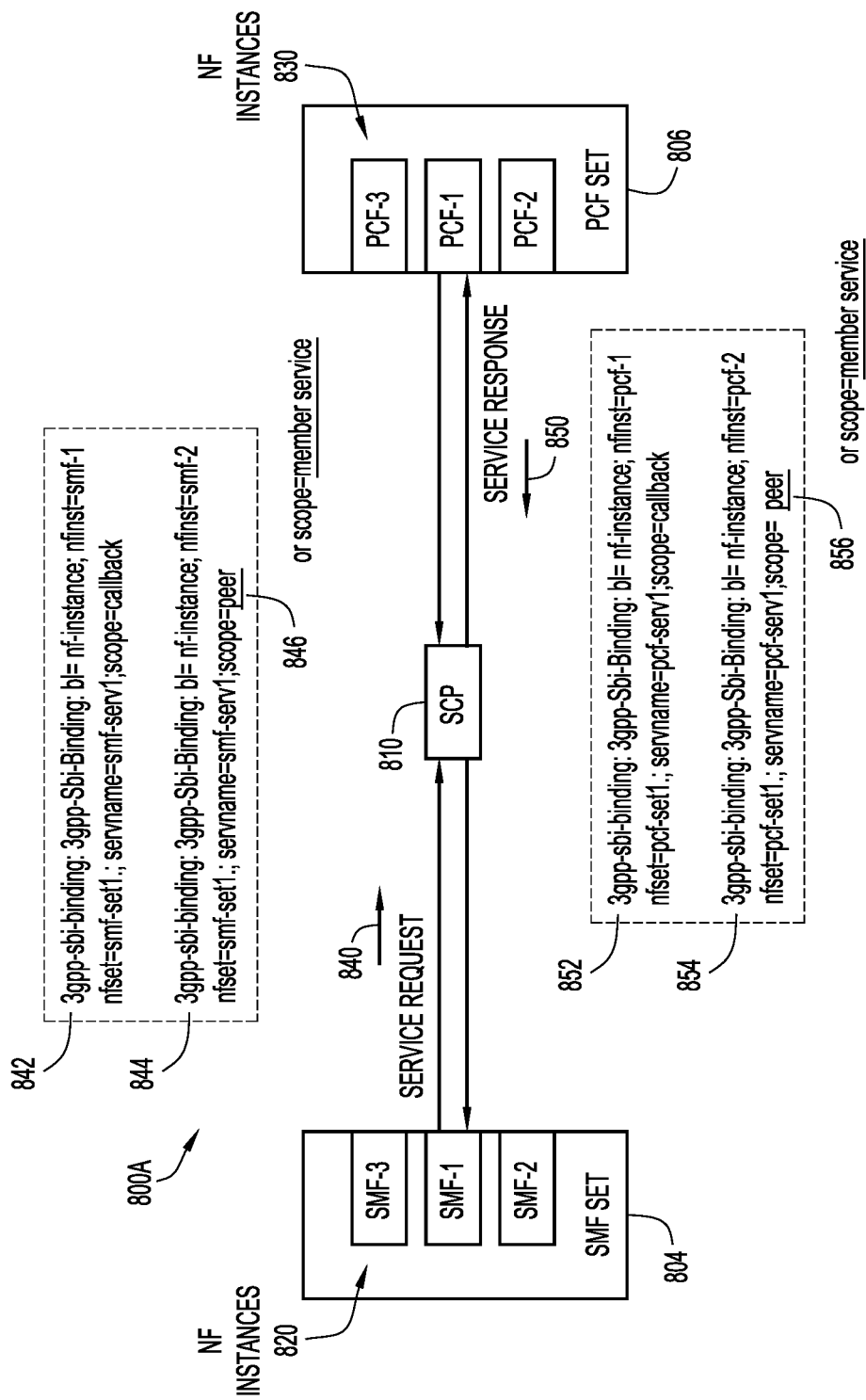
FIG. 8A is an illustrative example of message communication in an eSBA architecture of an 5G network, showing NF instances of two different NF Sets in indirect communication with each other via a SCP, and communicating messages indicating a service request and a service response, each of which may include multiple binding indications for load balancing or redundancy processing for communications between the NF instances according to some implementations of the present disclosure.
Figure 8B:
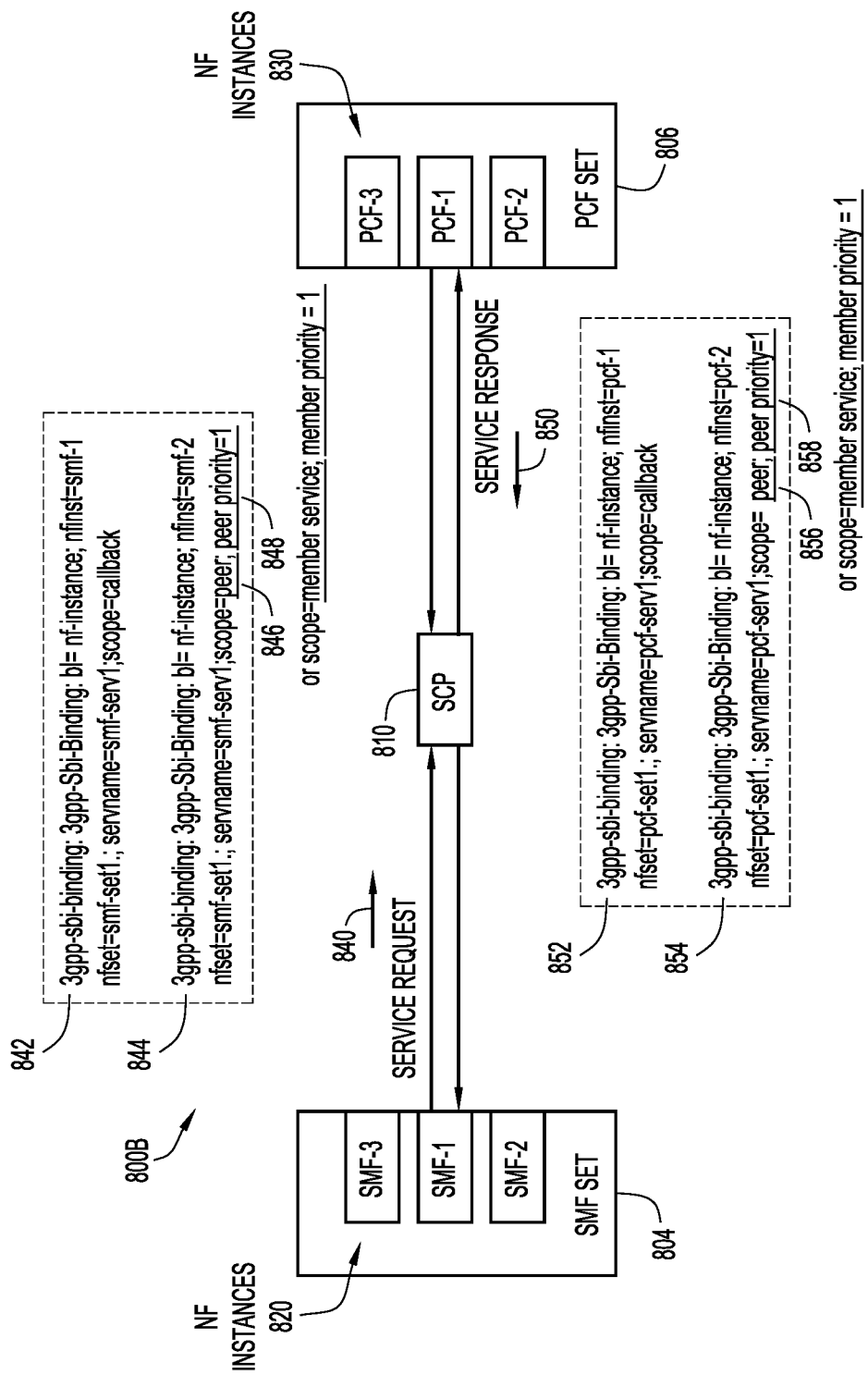
FIG. 8B is an illustrative example of another message communication in the eSBA architecture of the 5G network, showing NF instances of two different NF Sets in indirect communication with each other via the SCP, and communicating messages indicating a service request and a service response, each of which may include multiple binding indications and priority or weight values for load balancing or redundancy processing for communications between the NF instances according to some implementations of the present disclosure.

FIGS. 8A-8B are illustrative examples of message communications in eSBA architectures of a 5G network, for illustrating use of HTTP custom headers for multiple binding indications according to some implementations of the present disclosure. The example HTTP custom headers shown and described in relation to FIGS. 8A-8B may be for use in relation to the techniques described herein (e.g. in relation to the methods of FIGS. 6 and 7).

In particular, FIG. 8A is an illustrative example of a message communication in an eSBA architecture 800A of a 5G network, showing NF instances of two different NF sets in indirect communication with each other via an SCP 810 according to some implementations of the present disclosure. The two different NF sets in FIG. 8A include an NF Set 804 and an NF Set 806. In the example of FIG. 8A, NF Set 804 is an SMF Set and an NF Set 806 is a PCF Set. NF Set 804 (i.e. the SMF Set) may include a plurality of NF instances 820 (i.e. an NF Set of SMF instances, SMF-1 through SMF-3), and NF Set 806 (i.e. the PCF Set) may include a plurality of NF instances 830 (i.e. an NF Set of PCF instances, PCF-1 through PCF-3). In FIG. 8A, it is shown that an NF instance (i.e. SMF-1) of NF Set 804 (i.e. the SMF Set) may send a message indicating a service request 840 to another NF instance (i.e. PCF-1) of NF Set 806 (i.e. the PCF Set). Further, it is shown that the NF instance (i.e. PCF-1) of NF Set 806 (i.e. the PCF Set) may respond to send a message indicating a service response 850 back to the NF instance (i.e. SMF-1) of NF Set 804 (i.e. the SMF Set).

According to the present disclosure, the message indicating the service request 840 may be formatted with two or more headers 842 and 844 (e.g. two or more HTTP custom headers) having two or more binding indications, respectively. The multiple binding indications may be used for load balancing or redundancy processing according to some implementations of the present disclosure. More particularly in FIG. 8A, a binding indication associated with SMF-1 is shown to be populated in header 842 of the message indicating the service request 840 (where scope is set for "callback"), and an alternative binding indication associated with SMF-2 is also shown to be populated in header 844 of the message indicating the service request 840 (where scope is set for a "peer" 846). In addition, the message indicating the service response 850 may be formatted with two or more headers 852 and 854 (e.g. two or more HTTP custom headers) having two or more binding indications, respectively. More particularly, a binding indication associated with PCF-1 is shown to be populated in header 852 of the message indicating the service response 850 (where scope is set for "callback"), and an alternative binding indication associated with PCF-2 is also shown to be populated in a header 854 of the message indicating the service response 850 (where scope is set for a "peer" 856). In alternative implementations of FIG. 8A, each message may be formatted with a single header (e.g. a single HTTP custom header) having the two or more binding indications (e.g. each being separated by a comma).

Thus, in some implementations according to FIG. 8A, each of one or more alternative binding indications may indicated in the HTTP custom header with use of a scope parameter having a predetermined value or designation, which indicates it as an equivalent NF or equivalent NF service.

FIG. 8B is an illustrative example of an eSBA architecture 800B of a 5G network, showing NF instances of two different NF sets in indirect communication with each other via an SCP 810 according to some implementations of the present disclosure. The message communication in the eSBA architecture 800B of FIG. 8B is substantially the same as that shown and described in relation to FIG. 8A, except that the header for the alternative binding is further associated with a priority value. For service request 840 of FIG. 8B, the alternative binding indication associated with SMF-2 is shown to be populated in header 844, where scope is set to "peer" 846, and where a "peer priority" value 848 is set to "1." For service response 850 of FIG. 8B, the alternative binding indication associated with PCF-2 is shown to be populated in header 854, where scope is set to "peer" 856, and where a "peer priority" value 858 is set to "1." Of course, a peer priority may be indicated as "priority=1," "priority=2,", "priority=3," etc., for prioritizing the use of multiple binding indications/members of the same NF (Service) Set according to the priority values (e.g. in the event of a backup failure).

In some implementations of FIGS. 8B, each binding indication may be associated with a weight value indicated in the same or similar manner as the priority value; for example, weights of "weight=50," "weight=25," and "weight=25" (out of a total of 100) may be assigned to three (3) NF (service) instances, for weighting the use of binding indications/members of the same NF (Service) Set (e.g. for load balancing). Thus, in some implementations according to FIG. 8B, each of the (alternative) binding indications may be associated with an additional parameter or value indicating a priority or a weight value (e.g. for load balancing or backup failure).

In relation to FIGS. 8A and 8B, again, according to the present disclosure, a message may be formatted with two or more distinct headers (e.g. two or more HTTP custom headers) having two or more binding indications according to the present disclosure; alternatively, the message may be formatted with a single header (e.g. a single HTTP custom header) having the two or more binding indications (e.g. each being separated by a comma).

Thus, load balancing and/or redundancy processing (e.g. for backup failure) may be achieved with use of multiple binding indications in one or more HTTP custom headers for 3gpp-Sbi-Binding. In a first case scenario, load balancing may be performed amongst NF instances in an NF Set. Here, the binding level may be set to NF Set. The consumer NF instance may send a request having multiple 3gpp-Sbi-Binding fields with different NF instance IDs. The SCP may receive the request, extract the NF instance IDs from the headers of the request, and cache them in memory. The SCP may perform load balancing and/or redundancy processing (e.g. for backup failure) amongst the NF instances identified by the NF instance IDs cached in the memory.

In a second case scenario, load balancing and/or redundancy processing (e.g. for backup failure) may be performed amongst NF service instances of an NF Service Set which is within an NF instance. Here, the binding level may be set to NF Set. A consumer NF may send a request having multiple 3gpp-Sbi-Binding fields with different NF Service Set IDs. An SCP may receive the request, extract the NF Service Set IDs from the headers of the request, and cache them in memory. The SCP may perform load balancing and/or redundancy processing (e.g. for backup failure) amongst the NF service instances based on the caching in the memory.

In a third case scenario, load balancing may be performed amongst NF service instances within an NF Service Set. Here, the binding level may be set to NF Service Set. The consumer NF may send a request having multiple 3gpp-Sbi-Binding fields with different NF Service Set IDs. The SCP may receive the request, extract the NF Service Set IDs from the headers of the request, and cache them in memory. The SCP may perform load balancing and/or redundancy processing (e.g. for backup failure) amongst the NF instances based on the caching in the memory.

According to other implementations, through initial configuration or via the NRF, a consumer NF may identify all NF instances that it belongs to (i.e. in its NF Set or Service Set). For example, the consumer NF may perform service discovery with the NRF, and the NRF may return NF instances of the same NF Set of the consumer NF in a discovery response. The NF (Service) Set information is part of the NF profile that the NRF obtains during registration, which it sends to the consumer NF in the service discovery. When sending a service request to a producer instance via the SCP, the consumer NF may populate multiple binding indications in the HTTP custom header for 3gpp-Sbi-Binding. The multiple binding indications in the HTTP custom header may be utilized for binding as well as for load balancing and/or redundancy processing (e.g. for backup failure).

Thus, high availability concerns in the current eSBA architecture may be resolved or simplified by leveraging use of an HTTP custom header. Better load balancing and/or redundancy processing (e.g. for backup failure) may be achieved at the SCP using the information of some or all the discovered peers that are communicated in a service request/response. In some implementations, a "1:1" High Availability may be achieved with the communication of two (2) binding indicators; on the other hand, an "N:M" High Availability may be achieved by the communication of multiple binding indicators (i.e. multiple peer or peer services).

According to some implementations, the SCP may operate to perform load balancing without applying any complex logic and/or without interacting with the NRF. In other implementations, the SCP may perform conventional load balancing with conventional complex logic and/or interact with the NRF, but utilize the techniques and mechanisms of the present disclosure as a fallback or fallback mechanism if the conventional mechanisms fail.

Figure 9:
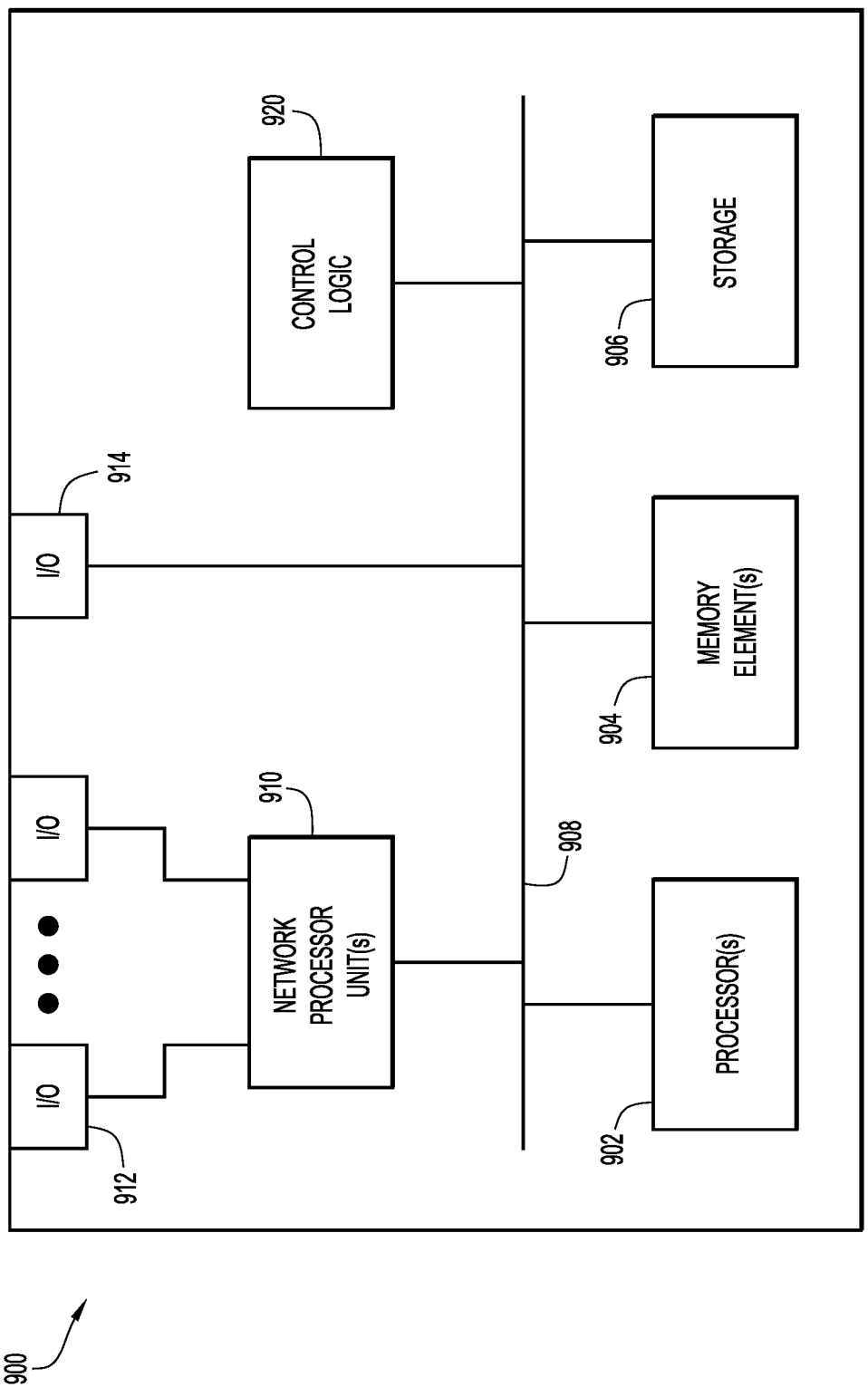
FIG. 9 illustrates a hardware block diagram of a computing device that may perform functions associated with operations discussed herein.

FIG. 9 illustrates a hardware block diagram of a computing device 900 that may perform functions associated with operations discussed herein in connection with the techniques described in relation to the above figures, especially in relation to FIGS. 6, 7, and 8A-8B. In various embodiments, a computing device, such as computing device 900 or any combination of computing devices 900, may be configured as any entity/entities as discussed for the techniques depicted in connection with the figures in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm·wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The invention claimed is:

1. A method comprising:
at a network function (NF) instance or NF service instance,
constructing a message with one or more headers used to signal binding information, by populating in the one or more headers:
a binding indication comprising an address of the NF instance or NF service instance, the binding indication being associated with a service; and
one or more alternative binding indications comprising one or more alternative addresses of one or more alternative NF instances or alternative NF service instances, the one or more alternative binding indications being associated with the same service as the binding indication; and
causing the message to be sent for communication to a recipient NF instance or recipient NF service instance.

2. The method of claim 1, wherein the one or more headers used to signal binding information comprise a Hypertext Transfer Protocol (HTTP) custom header for 3gpp-Sbi-Binding according to Third Generation Partnership Project (3GPP) specifications.

3. The method of claim 1, wherein:
the NF instance or NF service instance is configured to have access to context data for processing, and the one or more alternative NF instances or alternative NF service instances are configured to have access to the same context data for processing as the NF instance or NF service instance.

4. The method of claim 1, wherein:
the address is for use by the recipient NF instance or recipient NF service instance for communication of messages to the NF instance or NF service instance for the service, and
the one or more alternative addresses are for use by the recipient NF instance or recipient NF service instance for the communication of the messages to the one or more alternative NF instances or alternative NF service instances for the same service, for load balancing with or backup failure measure for the NF instance or NF service instance.

5. The method of claim 1, wherein causing the message to be sent comprises causing the message to be sent via a proxy for communication to the recipient NF instance or recipient NF service instance, and wherein:
the address is for use by the proxy for communication of messages to the NF instance or NF service instance for the service, and
the one or more alternative addresses are for use by the proxy for the communication of the messages to the one or more alternative NF instances or alternative NF service instances for the same service, for load balancing with or backup failure measure for the NF instance or NF service instance.

6. The method of claim 1, further comprising:
at the NF instance or NF service instance,
prior to constructing the message, obtaining the one or more alternative addresses of the one or more alternative NF instances or alternative NF service instances of the same NF Set or same NF Service Set.

7. The method of claim 1, wherein the message indicates a request or a response, and wherein:
the NF instance or NF service instance comprises an NF Consumer instance, the one or more alternative NF instances or alternative NF service instances comprises one or more alternative NF Consumer instances, and the recipient NF instance or recipient NF service instance comprises an NF Producer instance, or
the NF instance or NF service instance comprises an NF Producer instance, the one or more alternative NF instances or alternative NF service instances comprises one or more alternative NF Producer instances, and the recipient NF instance or recipient NF service instance comprises an NF Consumer instance.

8. The method of claim 2, wherein each of the one or more alternative binding indications is associated with a scope parameter having a predetermined value or designation indicating it as an equivalent NF or equivalent NF service for the same service as the binding indication.

9. The method of claim 5, wherein the proxy comprises a Service Communication Proxy (SCP).

10. The method of claim 8, wherein each alternative binding indication is further associated with an additional parameter or value indicating a priority or a weight associated with the alternative binding indication for load balancing with or backup failure measure for the NF instance or NF service instance.

11. A method comprising:
at a recipient network function (NF) instance or recipient NF service instance, or at a proxy for the recipient NF instance or recipient NF service instance,
receiving a message with one or more headers used to signal binding information;
obtaining, from the one or more headers, a binding indication comprising an address of an NF instance or NF service instance, the binding indication being associated with a service;
obtaining, from the one or more headers, one or more alternative binding indications comprising one or more alternative addresses of one or more alternative NF instances or alternative NF service instances, the one or more alternative binding indications being associated with the same service as the binding indication;
caching in memory the address of the NF instance or NF service instance, and the one or more alternative addresses of the one or more alternative NF instances or alternative NF service instances;
using the address retrieved from the memory for communication of messages to the NF instance or NF service instance for the service; and
using the one or more alternative addresses retrieved from the memory for the communication of the messages to the one or more alternative NF instances or alternative NF service instances for the same service, for load balancing with or backup failure measure for the NF instance or NF service instance.

12. The method of claim 11, wherein the one or more headers used to signal binding information comprise a Hypertext Transfer Protocol (HTTP) custom header for 3gpp-Sbi-Binding according to Third Generation Partnership Project (3GPP) specifications.

13. The method of claim 11, wherein each alternative binding indication is further associated with an additional parameter or value indicating a priority or a weight value associated with the alternative binding indication for the load balancing with or the backup failure measure for the NF instance or NF service instance.

14. The method of claim 11, wherein the message indicates a request or a response, and wherein:
the NF instance or NF service instance comprises an NF Consumer instance, the one or more alternative NF instances or alternative NF service instances comprises one or more alternative NF Consumer instances, and the recipient NF instance or recipient NF service instance comprises an NF Producer instance, or
the NF instance or NF service instance comprises an NF Producer instance, the one or more alternative NF instances or alternative NF service instances comprises one or more alternative NF Producer instances, and the recipient NF instance or recipient NF service instance comprises an NF Consumer instance.

15. The method of claim 11, which is performed at the proxy which comprises a Service Communication Proxy (SCP).

16. The method of claim 12, wherein:
each of the one or more alternative binding indications is indicated with a scope parameter having a predetermined value or designation indicating it as an equivalent NF or equivalent NF service for the same service as the binding indication,
the NF instance or NF service instance is configured to have access to context data for processing, and
the one or more alternative NF instances or alternative NF service instances are configured to have access to the same context data for processing as the NF instance or NF service instance.

17. A computing device comprising:
one or more processors;
one or more memory elements coupled to the one or more processors;
instructions stored in the one or more memory elements;
the instructions being executable on the one or more processors for operation as a Service Communication Proxy (SCP) for:
- receiving a message with one or more headers used to signal binding information, the message being destined to a recipient network function (NF) instance or recipient NF service instance;
- obtaining, from the one or more headers, a binding indication comprising an address of an NF instance or NF service instance, the binding indication being associated with a service;
- obtaining, from the one or more headers, one or more alternative binding indications comprising one or more alternative addresses of one or more alternative NF instances or alternative NF service instances, the one or more alternative binding indications being associated with the same service as the binding indication;
- caching in memory the address of the NF instance or NF service instance, and the one or more alternative addresses of the one or more alternative NF instances or alternative NF service instances;
- using the address retrieved from the memory for communication of messages to the NF instance or NF service instance for the service; and
- using the one or more alternative addresses retrieved from the memory for the communication of the messages to the one or more alternative NF instances or alternative NF service instances for the same service, for load balancing with or backup failure measure for the NF instance or NF service instance.

18. The computing device of claim 17, wherein the one or more headers used to signal binding information comprise a Hypertext Transfer Protocol (HTTP) custom header for 3gpp-Sbi-Binding according to Third Generation Partnership Project (3GPP) specifications.

19. The computing device of claim 17, wherein:
the NF instance or NF service instance is configured to have access to context data for processing, and the one or more alternative NF instances or alternative NF service instances are configured to have access to the same context data for processing as the NF instance or NF service instance, and
the NF instance or NF service instance comprises an NF Consumer instance, the one or more alternative NF instances or alternative NF service instances comprises one or more alternative NF Consumer instances, and the recipient NF instance or recipient NF service instance comprises an NF Producer instance, or
the NF instance or NF service instance comprises an NF Producer instance, the one or more alternative NF instances or alternative NF service instances comprises one or more alternative NF Producer instances, and the recipient NF instance or recipient NF service instance comprises an NF Consumer instance.

20. The computing device of claim 18, wherein each of the one or more alternative binding indications is indicated in the HTTP custom header with a scope having a predetermined value or designation which indicates it as an equivalent NF or equivalent NF service for the same service as the binding indication.

* * * * *